Figure 3:
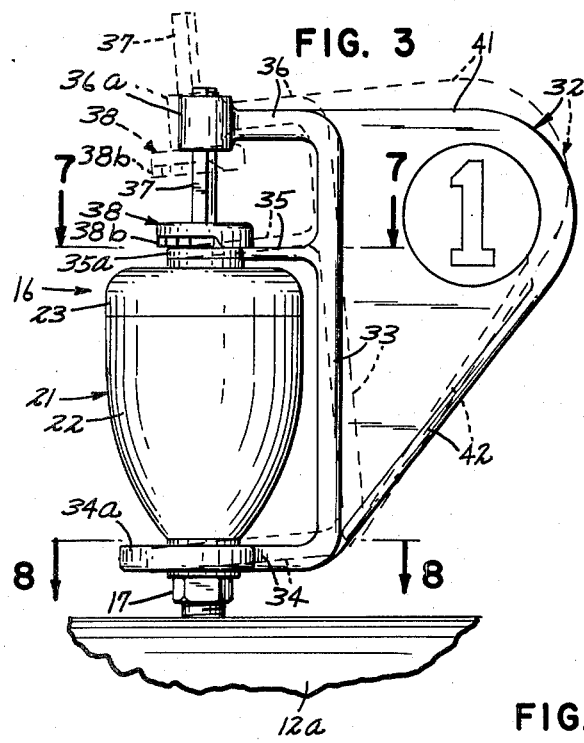

United States Patent [19]

Vikre

[11] 4,231,523
[45] Nov. 4, 1980

[54] IRRIGATION SYSTEM AND VOLUME CONTROL VALVE THEREFOR

[76] Inventor: Merle A. Vikre, 32 Windward Way, New Port Richey, Fla. 33552

[21] Appl. No.: 971,038

[22] Filed: Dec. 19, 1978

Related U.S. Application Data

[63] Continuation of Ser. No. 765,266, Feb. 3, 1977, abandoned.

[51] Int. Cl.$^2$ .............................................. B05B 1/32
[52] U.S. Cl. ..................................... 239/454; 138/46; 239/533.1; 239/570
[58] Field of Search ............................... 239/230–233, 239/454, 533.1, 533.13, 533.14, 570, 571, 54.2; 138/43, 45, 46

[56] References Cited

U.S. PATENT DOCUMENTS

| | | | |
|---|---|---|---|
| 2,460,647 | 2/1949 | Miller | 138/43 |
| 2,488,234 | 11/1949 | Perry | 239/222.17 X |
| 3,077,903 | 2/1963 | Honsinger | 138/45 |
| 3,138,177 | 6/1964 | Cutler | 239/533.13 X |
| 3,592,237 | 7/1971 | Borschers | 138/43 |
| 3,837,363 | 9/1974 | Meronek | 239/533.13 X |
| 4,059,228 | 11/1977 | Werner | 239/542 X |

*Primary Examiner*—Andres Kashnikow
*Attorney, Agent, or Firm*—Merchant, Gould, Smith, Edell, Welter & Schmidt

[57] ABSTRACT

The disclosure is directed to a center pivot irrigation system capable of operation under high or low water pressure and a constant volume sprinkler head therefor, which together provide uniform water distribution over an agricultural field notwithstanding the presence of hills and valleys in the field, pressure fluctuations of the water source, friction losses or the direction or magnitude of the wind. The system employs a plurality of sprinkler heads each of which provides a constant volume of water to the annular area over which it travels. Because the annular areas increase in size and total water requirements with increasing distance from the center pivot, the water delivering capacity of each sprinkler head is chosen as a direct function of its radial distance from the center pivot, thus insuring the same water distribution to all points on the field. Each sprinkler head is designed to produce a spray pattern that extends laterally outward with a predetermined directional orientation. A vertical tail or rudder associated with the sprinkler head acts in weather vane fashion to direct the directional spray pattern into the wind at all times, thus preventing the water spray from being blown from its intended area, which results in nonuniform distribution. The sprinkler heads are also constructed for tipping relative to a vertical axis, and ailerons extending laterally from the rudder act to tip the head and spray pattern downward to a degree in the face of particularly strong winds, thus insuring that the water reaches its destination.

32 Claims, 19 Drawing Figures

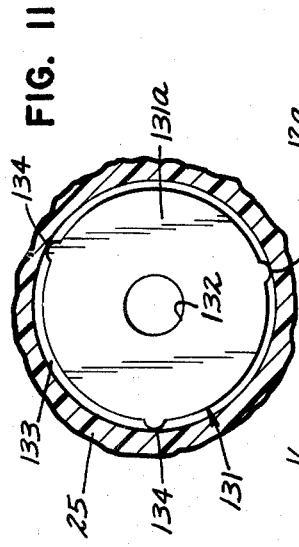
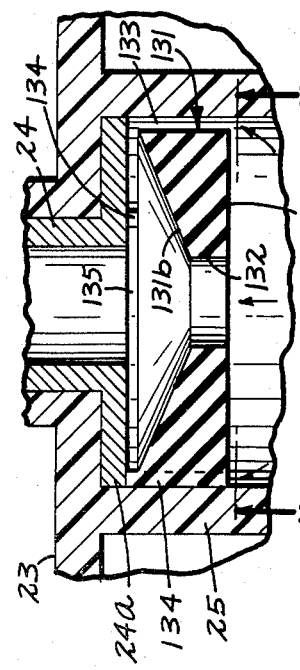
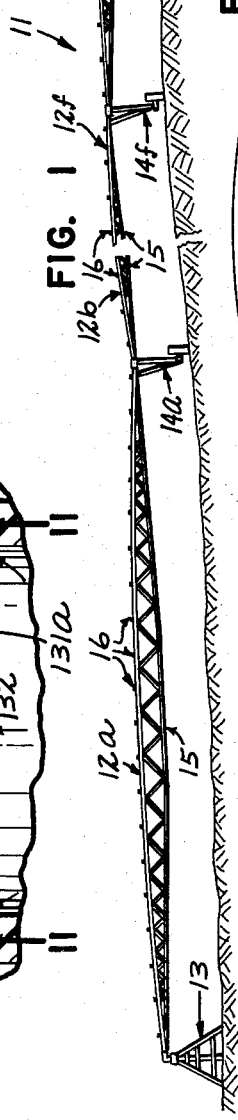
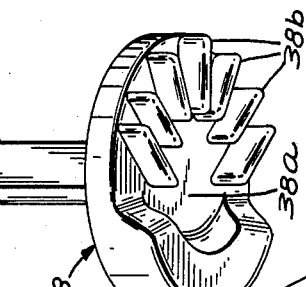
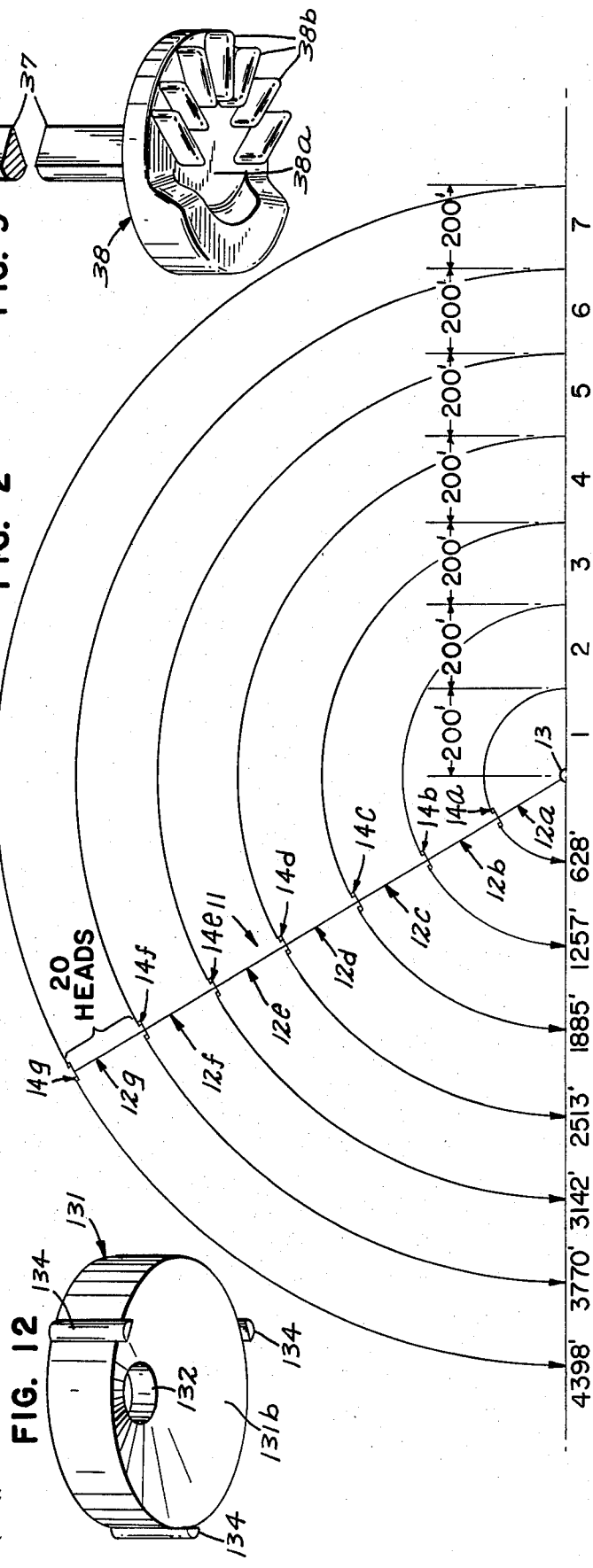

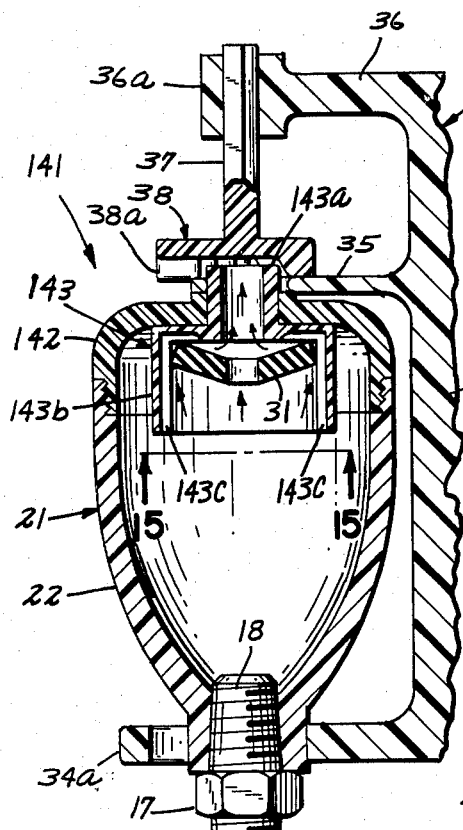
FIG. 13
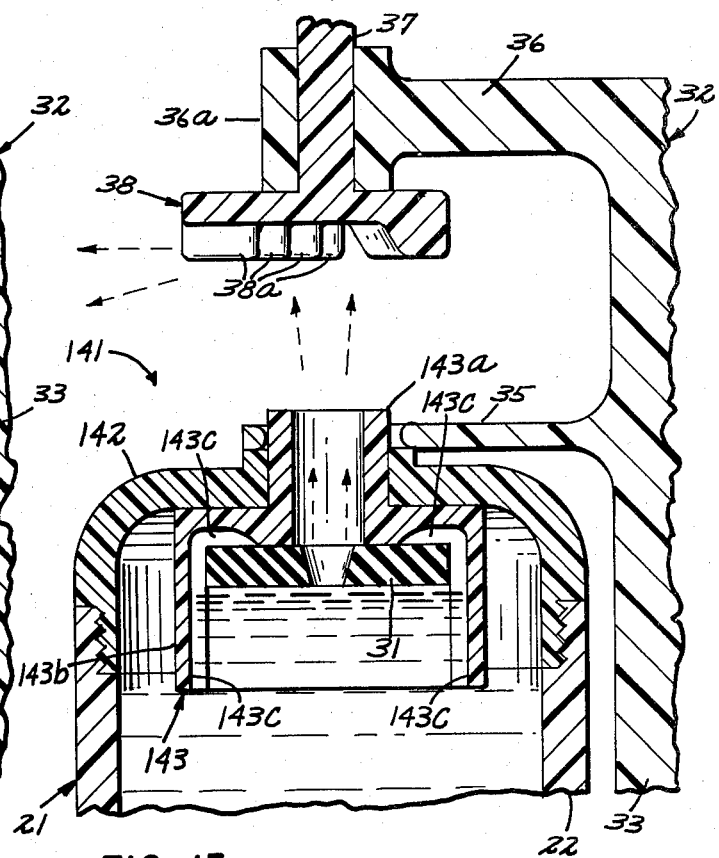
FIG. 14
FIG. 15
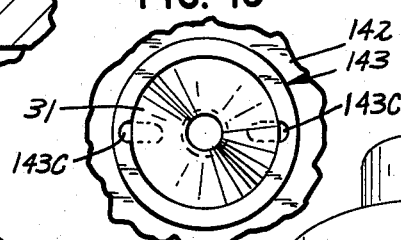
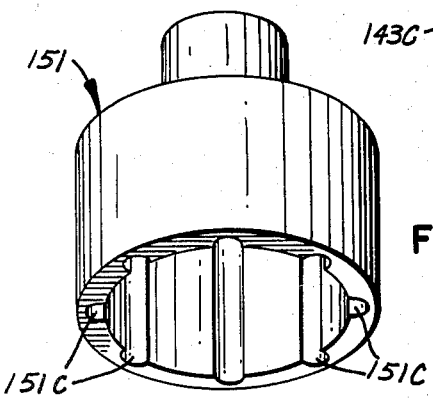
FIG. 16
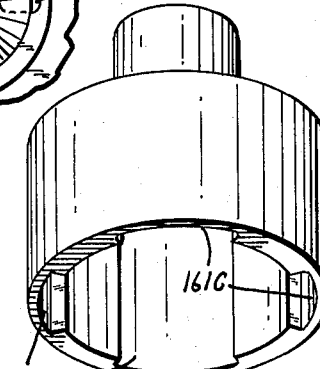
FIG. 18
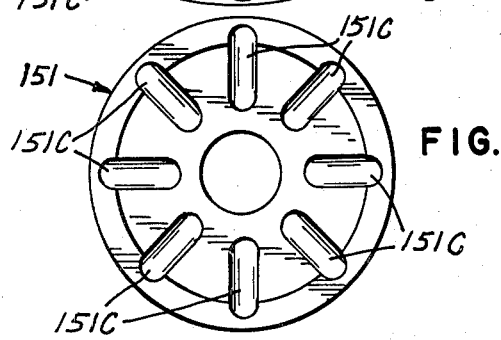
FIG. 17
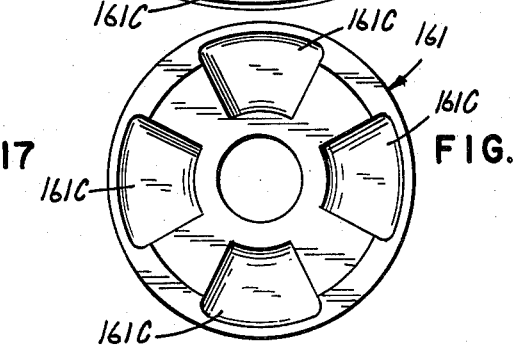
FIG. 19

IRRIGATION SYSTEM AND VOLUME CONTROL VALVE THEREFOR

This is a continuation of application Ser. No. 765,266, filed Feb. 3, 1977 now abandoned.

BACKGROUND OF THE INVENTION

The invention is generally related to water distributing systems and devices, and is specifically directed to a center-pivot, field irrigation system capable of operating at low or high water pressure, and a constant-volume sprinkler head for such irrigation systems.

Center-pivot irrigation systems typically comprise an extremely long water conduit "arm", which is pivotally connected at one end to a source of water under pressure. The conduit arm is carried in an elevated position, usually by a plurality of radially spaced wheeled towers which are powered by hydraulic, pneumatic or electrical motors to rotatably sweep the conduit arm through and over a circular field. The conduit arm includes a predetermined number of water sprinkling heads, which are radially spaced over its length and constructed to distribute a spray of water on the circular or annular field area over which they pass.

Center-pivot irrigation systems have strongly and successfully established themselves in the farming community. Although initially expensive, they presently represent one of the most efficient manners of irrigation, insuring that most of the crop receives an adequate supply of water and thus increasing crop yield.

For some period of time, center-pivot irrigation systems have operated a reasonably high water pressure, typically on the order of 70 psi. This has been environmentally and economically unsound, since such levels of operation require more elaborate pumping equipment, as well as conduit and sprinkler heads capable of withstanding such pressures. High pressure equipment is more expensive to operate due to fuel consumption. Further, the extreme pressure causes substantial evaporation of the water for at least two reasons. First, the water is often propelled through the air for significant distances where higher pressures are used, and the more exposure to the air, particularly when it is dry, the greater the degree of evaporation. Secondly, irrigation systems of this type often create a spray by directing a high velocity water jet against a deflector. The resulting spray is a fine mist, at least in part, which is highly subject to evaporation before it reaches the ground, and the problem is severely compounded by windy conditions, which also tend to blow the spray away from the intended area.

Consequently, many of the newer systems have been designed to operate at low water pressure, typically on the order of 20 psi. Lower pressures clearly have the advantage of less operating cost, and there is usually less evaporation under still conditions. However, evaporation and misdirection of the spray pattern have continued to be a problem under windy conditions, resulting in erratic and nonuniform distribution of water over the field. Nonuniform distribution is even more pronounced where differences in elevation occur in the field even where such differences in elevation occur in the field even where such differences are not great. A severe pressure drop occurs wherever there is any degree of elevational difference in the conduit arm. This results in poor water distribution in the high areas of the field, whereas over watering occurs in the low spots. Thus, the field becomes "spotted" with areas which have received too little or too much irrigation, and much or all of the advantage of low pressure irrigation is lost. This is not, of course, conducive to optimum crop yield.

The inventive irrigation system and sprinkler head therefore are the result of an endeavor to develop a low pressure center-pivot system capable of uniformly distributing water over the field notwithstanding differences in elevation or windy conditions, and that overcomes high percentage water losses due to evaporation.

The irrigation system comprises an elevated conduit arm that is pivotally connected to a stationary point (usually the well pipe), and is powered to rotatably sweep through and over the field. The system further comprises a plurality of sprinkler heads spaced over the length of the conduit arm, each of which is constructed to create a spray formed from water droplets that are large enough to resist being blown off-course by the wind, but not so large as to damage farm plants that may be small and fragile after sprouting and during early development.

Because the area of a circular field increases exponentially as the field radius increases, the system must be properly designed to insure that the sprinkler heads have the capacity to cover the entire field with a sufficient volume of water, and that this predetermined volume is uniformly distributed even without elevation differences or windy conditions. Thus, assuming that the sprinkler heads are equidistantly spaced, each successive head in the radially outward direction generally must have a greater output capacity since the annular area which it overlies is greater than the annular area which next precedes it. Stated otherwise, although the annular band width of all sprinkler head areas may be essentially constant with equidistant spacing, each successive area nevertheless increases appreciably because its effective radius increases. Accordingly, the output capacity of each sprinkler head must be chosen to deliver the proper volume of water per unit of time based on the specific area which it overlies and serves.

Although I prefer increasing the output capacity of successive sprinkler heads as a function of their radial distance from the pivot point, it would be possible to use sprinkler heads of the same output capacity and decrease the spacing therebetween as a function of increasing radial distance from the pivot point. Because the output capacity of my unique sprinkler head can be varied much more easily (due to interchangeability of control components) than can sprinkler head spacing on the conduit arm, the equidistant spacing approach is strongly preferred. This is particularly so since proper water distribution is necessarily conditioned on geographic area, annual rainfall, type of crop and the like. Further, many existing systems already have equidistantly spaced sprinkler heads but can be readily converted to the inventive system.

Having designed the system to be capable of uniform and sufficient water distribution over the entire field, the problem of pressure fluctuations due to differences in elevation can be overcome on an individual sprinkler head basis. This is accomplished through the use of a volume control device within the sprinkler head that maintains a constant volume output even in the face of water pressure fluctuations in the conduit arm. Thus, assuming that water under a predetermined minimum pressure of sufficient volume is always supplied to the conduit arm, the individual sprinkler heads respond to the delivered pressure and distribute the same volume of water in the same spray pattern throughout all phases of the operation.

I have overcome the problem of wind affects by designing a sprinkler head that creates a flow pattern that is less than 360°, and which is always directed into the wind. This is specifically accomplished with a deflector designed to create the desired flow pattern upon impingement by a low pressure water jet. The deflector is mounted for rotation in an essentially horizontal plane and includes a wind-sensitive vane that always keeps the deflector in a position directing the spray into the wind. The deflector is also constructed to be tipped about an essentially horizontal axis, and aileron-like devices are also included which cause the deflector to tip under severe windy conditions, directing the spray pattern somewhat downward as well as into the wind.

I have found that the inventive low pressure, center-pivot irrigation system employing these unique sprinkler heads successfully combats the problem of uneven water distribution and spotty crop production due to differences in elevation, windy conditions, friction loss and water evaporation. Further, since the sprinkler head is designed with component interchangeability in mind, an irrigation system can be custom designed to the conditions of a specific field with very little difficulty.

The inventive irrigation system and sprinkler head include a number of additional advantageous structural features, which will become apparent from the drawings and description below.

BRIEF DESCRIPTION OF THE DRAWINGS

FIG. 1 is a fragmentary view in side elevation of a low pressure, center-pivot irrigation system embodying the inventive concept;

FIG. 2 is a schematic and graphic representation of the irrigation system and one-half to the field which the system irrigates;

FIG. 3 is an enlarged view in side elevation of a sprinkler head constructed in accordance with the inventive concept;

FIG. 4 is a view in top plan of the sprinkler head;

FIG. 5 is an enlarged fragmentary sectional view of the sprinkler head taken along the line 5—5 of FIG. 4, showing the component construction in detail in a first operating state;

FIG. 6 is a further fragmented view of FIG. 4 with the sprinkler head in a second operating position;

FIG. 7 is a fragmentary sectional view of the sprinkler head taken along the line 7—7 of FIG. 3;

FIG. 8 is a fragmentary sectional view of the sprinkler head taken along the line 8—8 of FIG. 3;

FIG. 9 is an enlarged perspective view of a spray deflector used in the sprinkler head;

FIG. 10 is an enlarged fragmentary sectional view of an alternative embodiment of portions of the sprinkler head;

FIG. 11 is a fragmentary sectional view taken along the line 11—11 of FIG. 10;

FIG. 12 is a perspective view of a constant-volume flow control device used in the alternative sprinkler head;

FIG. 13 is an enlarged fragmentary sectional view similar to FIG. 5 of an alternative embodiment of the sprinkler head, in a first operating position;

FIG. 14 is a further enlarged fragmentary sectional view of the sprinkler head shown in a second operating position;

FIG. 15 is a fragmentary sectional view taken along the line 15—15 of FIG. 13;

FIG. 16 is an alternative embodiment in perspective view of an auxiliary flow structural component for the sprinkler head;

FIG. 17 is a view in bottom plan of the auxiliary flow component of FIG. 16;

FIG. 18 is a further alternative embodiment in perspective view of an auxiliary flow structural component for the sprinkler head; and FIG. 19 is a view in bottom plan of the auxiliary flow component of FIG. 18.

DESCRIPTION OF THE PREFERRED EMBODIMENTS

With initial reference to FIG. 1 a center-pivot irrigation system constructed for operation at low water pressures is represented generally by the numeral 11. Irrigation system 11 consists of an extremely long water conduit "arm", which is made up of a plurality of conduit sections **12*a*–12*g* which are serially connected to permit the flow of water over the entire length. One end of the conduit arm is pivotally connected to a source of water under pressure, such as a well pipe, and this connection is generally designated 13 in FIG. 1. The conduit arm is carried in an elevated position by a plurality of wheeled "towers" 14*a*–14*g*, the towers being disposed at the interconnection points of the conduit sections 12*a*–12*g* as shown. As such, there are the same number of towers as conduit sections, thus providing adequate support for the entire length of the water conduit arm. Supportive structure for each of the conduit sections 12*a*–12*g* is generally designated 15 in FIG. 1**.

As is well known in the art, the wheeled towers **14*a*–14*g* are motivated hydraulically, pneumatically or electrically in a coordinated manner so that the conduit arm rotatably sweeps through and over a field relative to the center pivot 13**.

Each of the conduit sections **12*a*–12*g* includes a plurality of water sprinkling or spray heads 16 which are equidistantly spaced over the entire length of the water conduit arm. With additional reference to FIG. 2, it will be seen that the irrigation system 11 is designed to irrigate a circular field having a diameter of 2800 feet, which is approximately ½ mile. Thus, the water conduit arm has a radial length of 1400 feet, and each of the 7 conduit sections 12*a*–12*g* is 200 feet long and includes 20 equidistantly spaced spray heads 16** to distribute water over its associated annular area. Thus, this particular irrigation system includes 140 spray heads which are designed to deliver a predetermined volume of water as described in further detail below. It will be appreciated to the person of ordinary skill that this irrigation system is exemplary, and it is possible for the system to be of varying lengths, depending on the field size, with varying numbers of conduit sections. The irrigation system may also include a greater or lesser number of spray heads having different volume flow capabilities, the objective being to distribute a predetermined volume of water onto the field in a given amount of time as uniformly as possible.

As shown in FIG. 2, the circumferential distance traveled by each spray head varies significantly based on its radial distance from the center pivot 13. The figures extending radially outward to the left in FIG. 2 represent the circumferential distances traveled by the respective towers **14*a*–14*g* as they move through the field. As an exemplary comparison, the outermost tower 14g travels approximately 4398 feet in one revolution of the conduit arm, whereas the innermost tower 14a travels only 628 feet through the same revolution. Thus, the tower 14g travels seven times the distance traveled by tower 14a, and a comparison of the volume of water distributed by a spray head 16 proximate the tower 14g and one proximate the tower 14a must reflect the difference in travel. Generally, where the spray heads 16 are equidistantly spaced over the length of the conduit arm, as with the irrigation system 11, the water distributing capacity of a given spray head must be established as a function of its radial distance from the center pivot 13. In the preferred embodiment, each spray head 16 has a water distributing capacity which is directly related to the distance it travels and the annular area which it irrigates; and its capacity in this respect is therefore greater than the spray head 16 which is radially inboard and less than that of the spray head 16 which is next radially outboard. It may also be possible to arrange the spray head 16** in groups or sets of two or three having the same water distributing capacity, with the set capacity increasing as a function of radial distance from the center pivot.

Where each spray head 16 has a different water distributing capacity, as in the preferred embodiment, I also prefer to identify each one with some type of symbol which is visually discernible at a distance. Thus, with reference to FIG. 3, the spray head 16 shown in side elevation includes the numeral "1", which quickly identifies it as the first or innermost spray head 16 in the conduit arm. Of course, the spray head identification may vary from system to system. For example, rather than a progressing continuous number sequence, it may be desirable to also identify the spray head by a letter which corresponds to the particular conduit section to which it belongs; e.g., A-1, 2, 3 . . . 20; B-1, 2, 3 . . . 20, etc. The objective of spray head identification is that the user be capable of quickly identifying the specific position of a specific spray head simply by observation. This is highly important where the system is custom designed to a particular field, and the agricultural user is not well versed on water distributing capacity in terms of outlet orifice sizes, inlet pressures, volume control rates and the like.

FIGS. 3–9 disclose the specific construction of a spray head 16 which is uniform throughout the system, with the exception that some of the components are interchangeable to vary its water distributing capacity.

Figure 6:
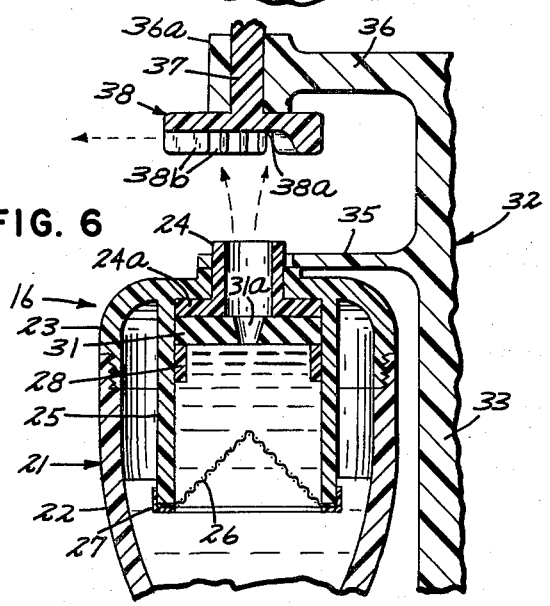
Figure 5:
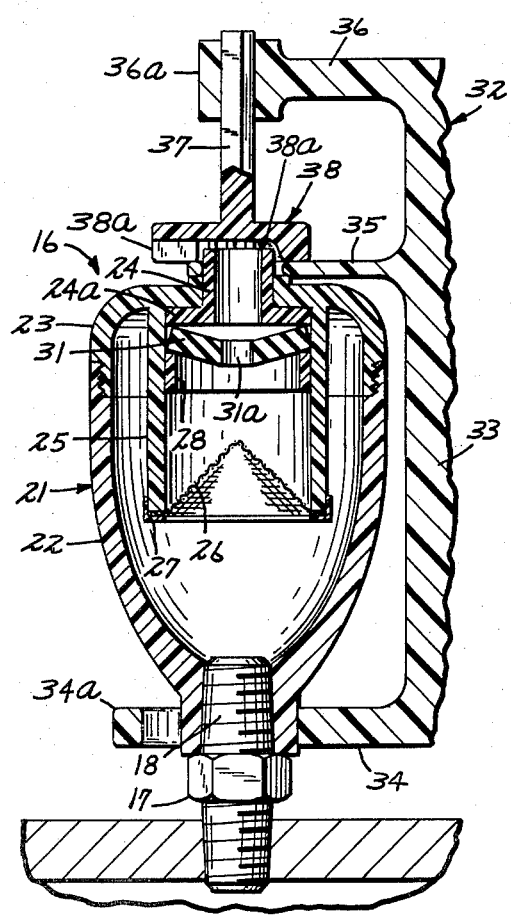

Each spray head 16 is connected directly to its associated section of the water conduit arm for fluid communication therewith. This is accomplished through the use of an adapter 17 which is rigidly secured to the conduit section, as by a threaded connection, and which includes a threaded nipple 18 (FIG. 5). Each of the spray heads 16 includes an upright housing 21 generally taking the form of an enclosed bowl, the lower end of which defines an internally threaded inlet permitting it to be rigidly screwed onto the threaded nipple 18 to define a housing inlet. The housing 21 in turn consists of a lower bowl portion 22 and a cover portion 23 which are threadably or otherwise mated as best shown in FIGS. 5 and 6. The upper end of the cover 23 defines a central outlet disposed in axial alignment with the housing inlet and the threaded nipple 18.

A nozzle member 24 of circular cross section and having an outlet of predetermined diameter is sized to frictionally project through the outlet of housing 21, being held in place by a retaining flange 24a. The outer diameter of the retaining flange 24a corresponds to the inner diameter of a cylindrical member 25 which projects axially downward in alignment with the housing inlet and outlet. Cylindrical member 25 is integrally formed with the cover 23 and open at its lower end. A conical filter screen 26 is held in place over the open end of the cylindrical member 25 by a retaining clip 27 or other suitable means.

A ring 28 is secured to the inner surfaces of cylindrical member 25, axially spaced from the end surface of the flange 24a to define an annular recess. A resilient washer 31 is disposed in the annular space, having a thickness generally corresponding thereto. In its nomral form, resilient washer 31 is concavo-convex so that its outlet side is spaced from the end surface of the flange 24a with the exception of a peripheral region of contact with the flat undersurface of the flange 24a. Washer 31 is formed with a fluid control passage 31a which is of uniform internal diameter in its normal state, such diameter being somewhat less than the internal diameter of the nozzle member 24.

As described, the resilient washer 31 serves as a control element to maintain the output of the spray head 16 at an essentially constant volume notwithstanding fluctuations of water pressure within the water conduit arm. More specifically, water entering the housing 21 through the threaded nipple 18 generally takes the form of a water jet. Upon striking the conical screen 26, it is dispersed outwardly to exert a uniform force over the bottom surface of washer 31. The washer 31 is designed to resiliently deform over a predetermined range of pressures. In the lower range, the washer 31 maintains the conical form shown in FIG. 5, and the control passage 31a remains in its widest position to permit the greatest volume of water to pass therethrough. At the higher end of the pressure range, the washer 31 deforms toward and ultimately into a flat position as shown in FIG. 6, increasingly engaging the flat undersurface of flange 24a, with the passage 31a becoming more and more restrictive on the inlet side. This has the effect of restricting the volume of water passing through and into the nozzle member 24. However, the volume of water is essentially the same since the pressure is increased to deliver the same amount of water through the smaller passage.

Between the lowest and highest pressures, the resilient washer 31 deforms in a modulating manner so that the proper volume of flow always leaves the nozzle 24.

The annular space between the outer surface of the cylindrical projection 25 and the inner surface of the housing 21 serves to capture air, which is compressed by the water within the housing 21. This compressed air serves as the shock absorber to rapid pressure fluctuations within the water conduit arm, thus preventing water vibration.

Figure 7:
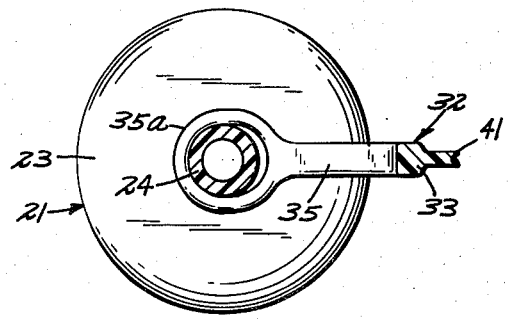
Figure 8:
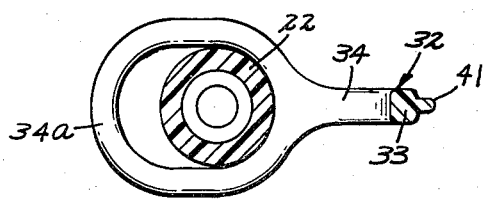

As pointed out above, the housing 21 of each spray head 16 is rigidly and immovably secured to the associated conduit section by the adapter 17. Each spray head 16 also consists of a frame 32 which is movable relative to the housing 21 in three respects which are described below. Frame 32 consists of a normally vertical upright member 33 having three spaced horizontal projections 34–36. The projections 34, 35 serve as the movable interconnection between the frame 32 and housing 21, as best shown in FIGS. 5, 7 and 8. As particularly shown in FIG. 7, projection 35 terminates in a collar 35a which completely encircles the nozzle member 24, but which is slightly elongated in its inner dimension to permit a limited amount of movement. Similarly, projection 34 terminates in a collar 34a which completely encircles the extreme lower end of the housing 21, but is even more elongated in its inner dimension to permit a greater degree of movement of the frame 32 relative to the housing 21. The collars 34a, 35a are in essential alignment with the vertical axis of the housing 21. As particularly shown in FIG. 5, collar 35a rests on and is supported by the extreme top of housing 21, and the materials from which these respective components are formed permit a low friction, bearing relationship so that the frame 32 may easily be rotated about the vertical axis of the housing 21. Further, by reason of the elongated inner dimension of the collars 34a, 35a, the movable frame may be tipped on the order of 10°–15° (see the broken line representation of FIG. 3), such tipping movement occurring relative to the bearing engagement of the collar 35a relative to the top of housing 21. As such, the tipping movement is essentially rotated about a horizontal axis passing through or proximate the top of housing 21. It will be appreciated that this horizontal tipping axis could be more precisely defined were the frame 32 to be pivotally pinned relative to the housing 21. However, I prefer the described structure because of its simplicity and economy of manufacture.

With specific reference to FIGS. 3–6 and 9, the projection 36 terminates in a bearing member 36a having an irregularly shaped bearing passage which slidably receives a shaft 37 of similar cross sectional shape. The irregular configuration, which is a segment of a circle (FIG. 4) enables the shaft to slide up and down vertically, while at the same time precluding rotation of the shaft 37 within the bearing 36a.

Figure 4:
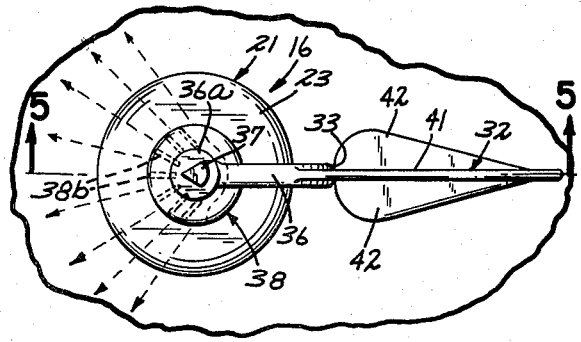

A spray deflector 38 is integrally formed at the bottom of shaft 37, and disposed in overlying relationship to the nozzle member 34. Deflector 38 is circular in shape in the preferred embodiment, including a central recess 38a and a plurality of radially disposed vanes 38b. As shown in FIG. 9, the vanes 38b are disposed in the plane of the recess 38a, and thus cause water received from the nozzle member 24 to be deflected radially outward into a spray pattern of predetermined configuration. As shown in FIG. 4, the pattern extends circumferentially on the order of 180°; the thickened portion of deflector 38 immediately rearward of the recess 38a (FIG. 9) precluding a spray pattern of greater angular circumference. The angular position of the spray deflector 38 relative to the movable frame 32 causes the resulting spray pattern to be directed away from the frame 32, as shown in FIG. 4, so that there is no interference by the frame with the spray.

Shaft 37 is sufficiently long to permit the spray deflector 38 to drop by gravity to a position engageably covering the nozzle 24 (FIG. 5) when the device is not in operation (i.e., when there is no water pressure). This particular feature prevents dirt, insects and other matter from entering the nozzle 24 during period of nonuse, and subsequently clogging the output of the device. Normal operating water pressure will force the spray deflector 38 upward into the position shown in FIG. 6, and it will be maintained in this operating position as long as the water jet from nozzle 24 continues.

Movable frame 32 includes a tail or rudder member 41 of general triangular configuration which extends rearwardly from the vertical member 33. As shown in FIG. 4, tail member 41 is uniformly thin in cross section, and it is disposed in a vertical plane which bisects the spray pattern created by deflector 38. As constructed, the tail member 41 causes the movable frame 32 to act as a weather vane, sensing the wind direction and pointing the spray deflector 38 directly into the wind. This of course insures that virtually all of the water emanating from the spray pattern falls on the annular area directly below the spray head 16 in question, rather than being blown by the wind onto another area or away from the field entirely.

With continued reference to FIGS. 1 and 2, a pair of generally triangularly shaped ailerons 42 project laterally from the angular trailing edge of trail member 41. As shown, the greatest lateral dimension of the ailerons 42 is near the bottom of the tail member 41, and this lateral dimension decreases in the upward direction. As constructed and disposed, the ailerons 42 are always exposed to a horizontal force component of the wind, and the size of the areas which they expose is chosen to permit a wind of sufficient velocity to tip the movable frame 32 into the broken line position shown in FIG. 3. Thus, under strong wind conditions, the spray pattern of deflector 38 not only is directed into the wind, but it is also directed angularly downward to prevent the spray from being blow away.

The particular construction of the deflector 38 also helps in this regard, since it is designed to create a spray of water droplets that are large enough to resist being blow off course by the wind, as is the case with a fine spray mist, but not so large as to damage the crop or the field.

Preferably, the irrigation system 11 is custom designed to the field through the appropriate selection of spray heads 16 to accomplish the objective of uniform water distribution in the proper amount. As pointed out above, the water distributing capacity of the spray heads 16 generally increases as a function of radial distance from the center pivot. However, this is not necessarily a linear relationship. For example, if the field to be irrigated includes areas of appreciable difference in elevation, it may be desired to provide spray heads 16 capable of delivering greater volumes of water in the higher areas, and spray heads 16 capable of delivering lesser volumes of water for the lower areas. This of course would take into account the anticipated water run off from the higher to lower areas.

Uniform construction and component interchangeability of the spray heads 16 is advantageous in this regard. It will be appreciated that the water distributing capacity of a spray head 16 is determined by the size of passage 31*a* in the resilient washer 31, as well as the inner diameter of nozzle 24. Both of these components are readily interchangeable to obtain the desired water distributing capacity. If further changes are necessary, it is also possible to interchange the cover portion 23 having an outlet of lesser size.

In operation, water is supplied to the irrigation system 11 at the center pivot 13 at approximately 20 psi. The system is designed for a minimal pressure drop from the center to the outermost point in the conduit arm with the system on flat ground. Stated otherwise, essentially uniform pressure appears at each of the spray heads 16 where there is no difference in elevation over the length of the conduit arm. Thus, when differences in elevation appear, such as between the towers 14*a* and 14*f* of FIG. 1, the resilient washer 31 of each spray head 16 will deform appropriately to maintain a constant volume of water from the nozzle 24. This insures that the proper amount of water falls on the annular area which a particular spray head 16 overlies. The spray heads 16 always face into the wind due to tail member 41, to insure that all water falls on the associated annular area; and the ailerons 42 cause the device to tip angularly downward under strong wind conditions to prevent the spray from blowing away.

FIGS. 10–12 disclose an alternative embodiment of the resilient washer, the modified form being generally designated 131. With respect to unmodified structure, like numerals represent the respective components.

Resilient washer 131 is designed to permit a greater flow of water in its undeformed state through the provision of auxiliary flow passages. To this end, resilient washer 131 is constructed to be essentially flat in its undeformed state, presenting a flat inlet surface 131*a* to the incoming water. The outlet face 131*b*, however, takes the form of a shallow conical recess capable of being deformed into engagement with the associated nozzle member 24. A passage 132, having a uniform cross section in the undeformed state, connects the surfaces 131*a*, 131*b*.

As best shown in FIG. 11, the outside diameter of resilient washer 131 is slightly less than the inside diameter of cylindrical member 25, thus creating an annular space 133 therebetween. The washer 131 is maintained in a centered position through the inclusion of three identical legs 134, which are equiangularly spaced on its outer peripheral face and integrally formed therewith. As shown in FIGS. 10 and 12, each of the legs 134 has an axial dimension slightly greater than the thickness of the washer 131, which causes the washer 131 to be axially spaced from the flange 24*a* as indicated by the reference numeral 135.

The thickness of the legs 134 is chosen so that the resilient washer 131 is frictionally retained within the cylindrical member 25. Alternatively, a retaining ring 28 could be used, although it would have to be circumferentially discontinuous to permit the passage of water in the annular space 133.

As constructed, with the resilient washer 131 in its undeformed state, water passes not only through the passage 132, but also through the annular space 133 and axial space 135 to increase the overall volume. This of course occurs when water pressure in the conduit arm has been decreased and the output volume needs to be maintained constant or increased. As water pressure increases, the resilient washer 131 deforms, thus changing the size of the passage 132 and, as a result, maintaining the volume constant. When water pressure builds up sufficiently, the conical surface 131*b* begins to engage the flange 24*a*, thus cutting off the auxiliary volume through the annular space 133. Operation of the device and system is otherwise the same.

FIGS. 13–15 disclose an alternative embodiment of portions of the sprinkler head which accomplish auxiliary flow in the low pressure state in a different manner. With respect to unmodified structure in FIGS. 13–15, the same numerals appearing in previous embodiments are again used, with the modified structure bearing new reference numerals.

The overall device, which bears the general reference numeral 141, includes an upright housing 21, of which the lower bowl portion 22 is the same. Housing 21 includes a modified upper or cover portion 142 which is threadably received by the lower portion 22 in sealed relation as in other embodiments. However, the cover 142 does not include an integrally formed cylindrical member 25. Rather, a separate cylindrical member 143 is provided which serves to establish a controlled auxiliary flow under low pressure conditions. The upper portion of auxiliary flow member 143 defines a nozzle member 143*a* and the lower cylindrical portion 143*b* serves to house a resilient washer 31. The auxiliary flow member 143 is constructed for interchangeability, with the outer diameter of the nozzle 143*a* corresponding to the inside diameter of the housing outlet opening to permit a press fit. As shown in FIGS. 9 and 10, the outer top surface of the lower cylindrical portion 143*b* abuts the inside bottom surface of the cover portion 142, and the inner top surface, which is annular in shape, defines a control surface with which the washer 41 cooperates.

With additional reference to FIG. 15, the lower cylindrical portion 143*b* has formed therein a pair of auxiliary flow channels 143*c* which are generally semicircular in cross section and diametrically opposed. Each of the flow channels 143*c* comprises a shallow groove which extends axially upward on the inner face of the cylindrical portion 143*b*, and then radially inward to a "blind" or dead end position on the control surface before it reaches the outlet of the nozzle 143*a*. As will become apparent, it is essential that the auxiliary flow channels 143*c* extend radially inward to some degree, although the distance may vary with the particular application.

The resilient washer 31 is frictionally received by the inner surface of the lower cylindrical portion 143*b*, as shown in FIGS. 13 and 14. FIG. 13 depicts the sprinkler head 141 in a low pressure operating state, in which the magnitude of water pressure entering the device is incapable of flexing the resilient washer 31. Consequently, the washer 31 remains in its unflexed or unstressed state, with the opening therethrough remaining of constant diameter to pass the maximum volume of water. The auxiliary flow channels 143*c* increase the volume of water passing through the nozzle outlet in this low pressure operating state by creating a bypass flow around the resilient washer 31.

This auxiliary flow continues as long as the water pressure continues to be low. As soon as water pressure increases, the resilient washer 31 begins to flex toward face engagement with the inside top surface of the lower cylindrical portion 143*b*. Thus, as the control passage of the resilient washer 31 becomes more restrictive, as shown in FIG. 14, the washer 31 itself also progressively decreases the bypass flow through the auxiliary channels 143*c* until it reaches its flattened position as shown in FIG. 14. In this position, the upper face of the washer 31 fully engages the inside top control surface of the auxiliary flow member 143, thus completely terminating the bypass flow.

The annular area between the cylindrical member 143 and the housing 21 retains a pocket of air for shock absorbing purposes in the same manner as the previously described embodiments.

FIGS. 16 and 17 disclose an alternative embodiment of the auxiliary flow member, which is represented generally by the numeral 151. The sole difference with the auxiliary flow member 141 resides in the inclusion of eight auxiliary passages 151*c* rather than two such passages. The auxiliary passages 151*c* are equiangularly spaced to provide uniform, balanced flow. The increased number of passages increases the volume of water passing through the nozzle outlet with the sprinkler head operating at minimum pressure.

FIGS. 18 and 19 disclose a further alternative embodiment of the auxiliary flow member, which is represented generally by the numeral 161. This device includes four equiangularly spaced auxiliary passages 161c each of which has a circumferential width greater than its radial depth, and thus has a greater flow capacity than one of the passages 151c. The passages 161c also extend axially upward along the inner cylindrical surface of member 161, thereafter tapering radially inward in a "blind" end.

It will be appreciated that interchangeability of the auxiliary flow members 141, 151, 161 permits selection appropriate to the volume of auxiliary flow required. Thus, for a particular agricultural field, an irrigation system can be custom designed through appropriate selection of the auxiliary flow devices.

What is claimed is:

1. A device for distributing a constant volume spray of water comprising:
   (a) an enclosed housing defining an internal chamber, a fluid inlet adapted for connection to a source of water for receiving water into the chamber, and an outlet constructed and arranged to issue a jet of water therefrom, the transverse dimension of the internal chamber being large in comparison with the transverse dimension of the inlet and outlet;
   (b) spray deflector means disposed relative to the outlet for intercepting the jet of water and deflecting it into a spray pattern of predetermined shape;
   (c) volume control means associated with the housing outlet for providing an essentially constant output volume of water from the housing outlet; and
   (d) a wall member projecting internally into the chamber from the housing outlet in encircling relation thereto and in general alignment therewith, the wall chamber defining an open free end through which water is received from the inlet, said wall member at its free end having an internal transverse dimension larger than the transverse dimension of said inlet and outlet, and said wall member being spaced from the internal wall of the housing to define a dead ended annular space therewith in which air may be caught to act as a shock absorbing cushion to incoming water.

2. The device defined by claim 1, wherein the wall member is cylindrical in shape.

3. The device defined by claim 2, which further comprises a screen member disposed over the free end of the cylindrical member.

4. The device defined by claim 3, wherein the screen member is conical in shape, the concave side thereof facing the housing inlet.

5. The device defined by claim 1, which further comprises a screen member disposed over the free end of the wall member.

6. The device defined by claim 1, wherein the outlet is defined by a nozzle member projecting through an opening in the housing and retainably disposed within the wall member.

7. The device defined by claim 6, wherein the nozzle member is removably disposed in the housing opening to permit interchangeability thereof.

8. The device defined by claim 7, wherein the housing inlet and outlet are alignably disposed in different housing sections.

9. The device defined by claim 1, wherein the enclosed housing comprises two interchangeable, matable sections.

10. The device defined by claim 1, wherein the wall member is disposed in alignment with the housing inlet.

11. The device defined by claim 1, wherein the enclosed housing is substantially bowl shaped, and the side wall of the internal chamber extends smoothly and continuously from the fluid inlet to the dead ended chamber.

12. A device for distributing a constant volume spray of water comprising:
   (a) an enclosed housing defining an internal chamber, a fluid inlet adapted for connection to a source of water for receiving water into the chamber, and an outlet constructed and arranged to issue a jet of water therefrom, the transverse dimension of the internal chamber being large in comparison with the transverse dimension of the inlet and outlet; (b) a cylindrical member projecting internally into the chamber from the housing outlet and in general alignment therewith, the cylindrical member defining an open free end through which water is received from the inlet, said cylindrical member at its free end having an internal transverse dimension larger than the transverse dimension of said inlet and outlet, the side wall of the cylindrical member being spaced from the internal wall of the housing to define a dead ended annular space therewith in which air may be caught to act as a shock absorbing cushion to incoming water;
   (c) spray deflector means disposed relative to the housing outlet for intercepting the jet of water and deflecting it into a spray pattern of predetermined shape;
   (d) and volume control means for providing an essentially constant output volume of water from the housing outlet, comprising a resilient washer retainably disposed within the cylindrical member and having a control opening disposed in alignment with the housing outlet, the resilient washer having a normal unstressed state in which the control opening permits the flow of a maximum amount of water, and a flow of stress states in which the control opening becomes progressively restrictive, the resilient washer being disposed within the cylindrical member so that incoming water acts on and stresses the washer as a function of water pressure.

13. The device defined by claim 12, wherein the housing comprises a control surface with which the outlet side of the resilient washer cooperates.

14. The device defined by claim 13, which further comprises auxiliary flow means for normally spacing the outlet side of the resilient washer from the control surface and from the cylindrical member to permit an auxiliary flow thereby when the resilient washer is not fully stressed.

15. The apparatus defined by claim 14, wherein the spacing means comprises a plurality of leg members integrally formed on the peripheral side of the resilient washer and extending beyond its outlet side, the ends of the leg members engaging the control surface and deformable with increasing water pressure to permit controlled engagement of the outlet side of the resilient washer with the control surface to progressively decrease said auxiliary flow.

16. The device defined by claim 14, wherein said control surface is formed within the cylindrical member in encircling relationship to the outlet, and the auxiliary flow means comprises a plurality of auxiliary flow channels formed on the inner cylindrical surface of the cylindrical member and extending radially inward on the control surface, the grooves being disposed relative to the resilient washer whereby, in its unstressed state, the washer permits auxiliary flow to the outlet, and with increasing water pressure, the washer becomes more stressed and progressively restricts the auxiliary flow channels.

17. The device defined by claim 16, wherein the cylindrical member is separate from the housing and interchangeably constructed.

18. The device defined by claim 17, wherein the cylindrical member comprises a nozzle member that cooperates with the housing to define said outlet.

19. The device defined by claim 16, wherein the auxiliary flow channels are equiangularly disposed within the cylindrical member.

20. The device defined by claim 16, wherein the auxiliary flow channels are generally semicircular in cross section.

21. The device defined by claim 16, wherein the circumferential width of each auxiliary flow channel is significantly greater than its radial depth.

22. The device defined by claim 16, wherein each auxiliary flow channel terminates in a blind end within the control surface, said blind end being spaced from the outlet, whereby engagement of the resilient washer with the control surface progressively restricts and ultimately terminates auxiliary flow.

23. The device defined in claim 12, wherein the resilient washer is normally concavo-convex and is stressable toward a flattened state.

24. The device defined by claim 12, wherein the cylindrical member is disposed in alignment with the housing inlet.

25. The device defined by claim 12, wherein a screen member is disposed over the free end of the cylindrical member.

26. The device defined by claim 25, wherein the screen member is conical in shape, the concave side thereof facing the housing inlet to uniformly distribute water over the inlet face of the resilient washer.

27. The device defined by claim 12, wherein the resilient washer is removably retained within the enclosure to permit interchangeability thereof.

28. The device defined by claim 12, wherein the resilient washer in its unstressed state defines a conical surface facing the housing outlet, the resilient washer being stressable by water pressure so that the conical surface approaches flatness.

29. The device defined by claim 12, wherein the control opening of the resilient washer is smaller than the housing outlet.

30. The device defined by claim 12, wherein said control surface is substantially flat, and the resilient washer defines a peripheral region that normally contacts said flat control surface in sealing relation, and increasingly engages the flat surface as it is stressed to its flattened state.

31. The device defined by claim 12, wherein the enclosed housing is substantially bowl shaped, and the side wall of the internal chamber extends smoothly and continuously from the fluid inlet to the dead ended chamber.

32. A spray head for distributing a constant volume of water comprising:
(a) an enclosed housing defining an internal chamber, said housing being comprised of a lower section having an inlet formed through it for receiving water into the chamber and an upper section removably secured to the lower section, said upper section having an outlet formed through it in alignment with said inlet to issue a jet of water therefrom;
(b) spray deflector means disposed relative to the outlet for intercepting the jet of water and deflecting it into a spray pattern of predetermined shape;
(c) a wall member formed integral with the upper section of the housing and projecting internally into the chamber from the housing outlet in an encircling relation thereto and in general alignment therewith, the wall member defining an open free end through which water is received from the inlet; and
(d) volume control means for providing an essentially constant output volume of water from the housing outlet, comprising a resilient washer retainably disposed within the wall member and having a control opening disposed adjacent to and in alignment with the housing outlet, the resilient washer having a normal unstressed state in which the control opening permits the flow of a maximum volume of water, and a flow of stress states in which the control opening becoming progressively restrictive, the resilient washer being disposed within the wall member so that incoming water acts on and stresses the washer as a function of water pressure, said wall member extending from said resilient washer toward said inlet a distance several times greater than the thickness of said resilient washer whereby the internal surface of said wall member serves to guide incoming water to said resilient washer and said outlet.

* * * * *